United States Patent [19]

Echigo et al.

[11] Patent Number: 5,748,868
[45] Date of Patent: May 5, 1998

[54] TWO-DIMENSIONAL MANAGEMENT PATTERN, INFORMATION DISPLAY TAG, AND IMAGE PROCESSING METHOD AND DEVICE

[75] Inventors: Tomio Echigo, Yokohama; Shunichi Asaka, Sagamihara, both of Japan

[73] Assignee: International Business Machines Corporation, Armonk, N.Y.

[21] Appl. No.: 492,501

[22] Filed: Jun. 20, 1995

[30] Foreign Application Priority Data

Jun. 20, 1994 [JP] Japan ................................. 6-137399

[51] Int. Cl.$^6$ ................................................. G06F 15/00
[52] U.S. Cl. ................................................. 395/133
[58] Field of Search ................................. 395/133, 131, 395/129, 130; 365/113, 121

[56] References Cited

U.S. PATENT DOCUMENTS 5,438,654  8/1995  Drebin et al. ........................... 395/139

*Primary Examiner*—Phu K. Nguyen
*Attorney, Agent, or Firm*—A. P. Tennent; K. O. Hesse

[57] ABSTRACT

An apparatus and method for efficiently displaying information for an object two-dimensionally. A two-dimensional pattern displayed in a two-dimensional tag comprises a first region consisting of a locational reference region that is square and located in the center of the first region for identifying the location and an identification region that surrounds the locational reference region and is a single data cell, a second region in which a black pattern and a white pattern appear alternately for identifying the starting location for reading information, and a third region for displaying coded information about the object. Detection of the square region in the first region allows detection of the location of the two-dimensional tag in which the two-dimensional pattern is displayed, while detection of the data cell of the second region in which black and white appear alternately allows detection and correction of the location of the two-dimensional tag. This constitution enables effective use of the outer circumference in which much information can be displayed.

18 Claims, 11 Drawing Sheets

TWO-DIMENSIONAL MANAGEMENT PATTERN, INFORMATION DISPLAY TAG, AND IMAGE PROCESSING METHOD AND DEVICE

BACKGROUND OF THE INVENTION

1. Field of the Invention

The present invention is related to a two-dimensional management pattern, an information display tag, and an image processing method and device, and particularly to a two-dimensional management pattern used for displaying information about an object, an information display tag for displaying the two-dimensional pattern, and an image processing method and device for obtaining information from the information display tag.

2. Description of Related Art

In the distribution sector and the like, the bar code has been widely used to identify and manage articles such as industrial products and food. As is well known, the bar code consists of a code made up of alternating black and white bar-like patterns, and has a tolerance for rotation such that the recorded code can be read from any direction by linearly scanning the code, and the bar code can also be detected even if the attitude of the code with respect to a detector is inclined. However, the bar code has a limit to the amount of information which can be represented, because the code and the like which can be represented by it are allocated to each individual manufacturer. Accordingly, many two-dimensional codes have been proposed which can represent more information.

There is, for instance, the code called PDF417 proposed by Symbol Technology Corp. The PDF417 code is constructed by two-dimensionally arranging bar codes in a plurality of stages to increase their capacity while making use of the advantages of the conventional bar code. However, since the bar codes are merely two-dimensionally arranged in a plurality of stages and thus the direction of detection is limited by their arrangement sequence and direction, the tolerance for rotation possessed by the conventional bar code is compromised. Thus, the inside of the region used as a two-dimensional code is not effectively utilized.

In addition, as another example, there is a code proposed by Veritec (Vericode), ID Matrix Corp., etc., which comprises two-dimensional cells consisting of individual black and white square data cells. However, to detect the code, a quiet zone and the like for detecting the two-dimensional region surrounding a data field in which data is recorded is required in the outer circumference of the data field. Since much information can be recorded in the outer circumference of the two-dimensional region because it has a large data capacity, to use it only for detecting the two-dimensional region is not economical.

In addition, in the warehousing industry, sometimes the bar code assigned to a product is used to manage the product and the like by delivery. In such product management, utilizing the ease of reading the bar code, a management code is predetermined instead of the code of the product itself, and the management code, which is effective only in a closed environment such as a warehouse, is sometimes used as a bar code for product management. The management code used in a closed environment needs not be a bar code. An actual example of such a management code in a closed environment is the array tag of Array-Tech Systems, a two-dimensional tag for extracting and recognizing a medium on which a management code placed in a wide area is recorded (hereinafter, referred to as a tag). In the array tag, cells are arranged in an octagonal shape, but the information density is different between the inner circumference and the outer circumference, so the outermost circumference is used to detect a data field as in the above described two-dimensional code, meaning that the region used as the two-dimensional code is not effectively used.

Accordingly, in the conventional two-dimensional codes, for each cell, data (codes) are handled with two types of values, black and white, and thus the information density is low and a large region is required to serve a large amount of information. Furthermore, since the outermost circumference of the large data capacity is utilized for detection, the region used for the code is not utilized efficiently.

SUMMARY OF THE INVENTION

The two-dimensional management pattern of the invention described in one embodiment is a two-dimensional management pattern used for reading the image of at least part of an object to detect information about the object based on the read image, comprising: a first region located near the center of the two-dimensional management pattern and having a location reference pattern for identifying the location of the two-dimensional management pattern, a second region with unit patterns of at least one of multiple types arranged in a specified direction from the first region to the outer circumference of the two-dimensional management pattern, and a third region other than the first and second regions with the multiple types of unit patterns arranged to represent the information about the object.

The two-dimensional management pattern of the invention described in another embodiment is a two-dimensional management pattern used for reading the image of at least part of an object to detect information about the object based on the read image, comprising: a first region located near the center of the two-dimensional management pattern and having a location reference pattern for identifying the location and direction of the two-dimensional management pattern, a second region with unit patterns of at least one of multiple types arranged in a specified direction from the first region to the outer circumference of the two-dimensional management pattern, and a third region other than the first and second regions with the multiple types of unit patterns arranged to represent the information about the object.

The second region has multiple types of unit patterns arranged in a specified direction from the first region to the outer circumference of the two-dimensional management pattern in such a way that patterns are contiguous in a specified sequence.

The location reference pattern has a direction pattern located in the center for identifying the direction, and a locational identification pattern arranged around the direction pattern in such a way that it can be distinguished from the direction pattern.

The second region may also have multiple types of unit patterns arranged in a specified direction along a straight line between a specified point in the first region and at least one point in the outer circumference of the two-dimensional management pattern in such a way that patterns are contiguous in a specified sequence.

The multiple types of unit patterns are rectangular and comprise a first pattern consisting of a first density over the entire surface, a second pattern consisting of a second density differing from the first density over the entire surface, a third pattern divided by a first diagonal line therein into one side consisting of the first density and the other consisting of the second density, a fourth pattern divided by a second diagonal line therein into one side consisting of the first density and the other consisting of the second density, a fifth pattern divided by the first diagonal line into one side consisting of the second density and the other consisting of the first density, and a sixth pattern divided by the second diagonal line into one site consisting of the second density and the other consisting of the first density.

The multiple types of unit patterns are rectangular and comprise a first pattern consisting of a first color over the entire surface, a second pattern consisting of a second color differing from the first color over the entire surface, a third pattern divided by a first diagonal line therein into one side consisting of the first color and the other consisting of the second color, a fourth pattern divided by a second diagonal line therein into one side consisting of the first color and the other consisting of the second color, a fifth pattern divided by the first diagonal line into one site consisting of the second color and the other consisting of the first color, and sixth pattern divided by the second diagonal line into one site consisting of the second color and the other consisting of the first color.

The information display tag of the invention described herein has the two-dimensional management pattern described herein.

Another embodiment of the invention is an image processing method for reading the information display tag as an image and detecting the information contained in the information display tag based on the read image, comprising the steps of: detecting the density or color of a plurality of sites of the image and determining that the sites differ when they have different densities or colors, and detecting the information contained in the information display tag based on the results of this determination.

Yet another embodiment of the invention is an image processing method for reading, as an image, the information display tag on which a two-dimensional management pattern is displayed and detecting the information contained in the information display tag based on the read image, comprising the steps of: detecting the density or color of a plurality of sites within the region in which the unit pattern is displayed, determining the relationship among the densities and colors corresponding to the respective sites, and identifying the unit pattern based on the relationship determined; and detecting the information contained in the information display tag based on the results of this determination.

In another embodiment, the image processing method comprises the steps of detecting the density or color of the two sites of the unit pattern divided by the diagonal line therein, that is, the first density or color of one site and the second density or color of the other, determining the difference between the first density or color and the second density or color, comparing the difference with the locational relationship among the densities and the other to determine the relationship among the densities and colors corresponding to the plurality of sites, and identifying the unit pattern based on the relationship thereby determined.

A further embodiment is an image processing method for reading, as an image, the information display tag on which a two-dimensional management pattern is displayed and detecting the information contained in the information display tag based on the read image, comprising the steps of: forming a converted image obtained by conversion such that very small regions of about the same density or color that differ from that of surrounding regions will have their density or color changed to that of surrounding regions, spatially differentiating the converted image to obtain a differentiated image, extracting the contour of the first region using the differentiated image, and identifying the location and direction of the two-dimensional management pattern based on the extracted contour.

The image processing device may also be embodied as comprising: an image pickup means for picking up an image including the information display tag on which a two-dimensional management pattern is displayed; a preprocessing means comprising an image conversion means for forming a converted image obtained by conversion such that very small regions of about the same density or color that differ from that of surrounding regions will have their density or color changed to that of surrounding regions based on the picked-up image, and a contour extraction means for spatially differentiating the converted image to obtain a differentiated image, then extracting the contour of the first region using the differentiated image; a tag location detection means for detecting the location and direction of the two-dimensional management pattern based on the extracted contour; a region setting means for setting the second and third regions based on the detected location and direction and also setting the region in which the unit pattern is displayed; and a cell data analysis means for detecting the density or color of a plurality of sites within the region in which the unit pattern is displayed, determining the relationship among the densities and colors corresponding to the respective sites, identifying the individual unit patterns based on the relationship thereby determined, and analyzing the information contained in the information display tag based on the arrangement of the multiple types of unit patterns identified.

The two-dimensional management pattern is used for reading the image of at least part of an object to detect information about the object based on the read image. Near the center of the two-dimensional management pattern is located a first region. The first region has a location reference pattern for identifying the location of the two-dimensional management pattern. In a second region extending from the first region to the outer circumference of the two-dimensional management pattern are arranged unit patterns of at least one of multiple types. A third region other than the first and second regions has arranged therein multiple types of unit patterns to represent the information about the object. As described above, since the first region for detecting the location of the two-dimensional management pattern is provided near the center, when the two-dimensional management pattern is identified from the image obtained by picking up at least part of the object, it can be detected by the first region near the center and information is displayed two-dimensionally, so that the information about the object can be efficiently represented two-dimensionally without using the vicinity of the outer circumference thereof for pattern identification. In addition, since, in the second region, unit patterns of at least one of multiple types are arranged, the second region can be used to detect the reference of the two-dimensional management pattern in the picked-up image.

In the two-dimensional management pattern, a first region located near the center of the two-dimensional management pattern has a location reference pattern for identifying the location and direction of the two-dimensional management pattern. Unit patterns of at least one of multiple types are arranged in a second region in a specified direction from the first region to the outer circumference of the two-dimensional management pattern. In a third region other than the first and second regions, the multiple types of unit patterns are arranged to represent the information about an object. As described above, since the first region for detecting the location and direction of the two-dimensional management pattern is provided near the center, when the two-dimensional management pattern is identified from the image obtained by picking up part of the object, it can be detected by the first region near the center and information is displayed two-dimensionally, so that the information about the object can be efficiently represented two-dimensionally without using the vicinity of the outer circumference thereof for pattern identification. The location reference pattern can have a direction pattern located near the center for identifying the direction, and a location identification pattern arranged around the direction pattern in such a way that it can be distinguished from the direction pattern. By forming the location reference pattern so that it includes the direction pattern and the location identification pattern, as described above, the two-dimensional management pattern can be detected from the image obtained by picking up part of the object, and the direction to the second region can be indicated.

The second region can have multiple types of unit patterns arranged in a specified direction from the first region to the outer circumference of the two-dimensional management pattern in such a way that patterns are contiguous in a specified sequence. If, in the second region in a specified direction in the two-dimensional management pattern, multiple types of unit patterns are arranged so that they are contiguous in a specified sequence, as described above, the attitude of the second region can easily be detected from the second region, and thus, even if the two-dimensional pattern in the image picked up is inclined, it can easily be corrected from the attitude of the two-dimensional management pattern obtained. In this case, the second region is preferably displayed for all of the regions included in the two-dimensional management pattern for detecting the attitude of the two-dimensional pattern. Thus, by arranging multiple types of unit patterns in a specified direction along a straight line between a specified point in the first region and at least one point in the outer circumference of the two-dimensional management pattern so that they are contiguous in a specified sequence, the second region can be formed so as to longitudinally run through the inside of the two-dimensional management pattern.

The multiple types of unit patterns are rectangular, and they are formed by providing the two regions on both sides of the diagonal line of the unit patterns with the same or a different density. That is, the multiple types of unit patterns comprise a first pattern consisting of a first density over the entire surface, a second pattern consisting of a second density differing from the first density over the entire surface, a third pattern divided by a first diagonal line therein into one site consisting of the first density and the other site consisting of the second density, a fourth pattern divided by a second diagonal line therein into one site consisting of the first density and the other consisting of the second density, a fifth pattern divided by the first diagonal line into one site consisting of the second density and the other consisting of the first density, and a sixth pattern divided by the second diagonal line into one site consisting of the second density and the other consisting of the first density. Accordingly, six patterns can be displayed as the unit patterns to be displayed in the two-dimensional management pattern, and the information about the object can be made to correspond to six values.

Further, the multiple types of unit patterns may be formed by different colors. That is, the multiple types of unit patterns can comprise a first pattern consisting of a first color over the entire surface, a second pattern consisting of a second color differing from the first color over the entire surface, a third pattern divided by a first diagonal line therein into one site consisting of the first color and the other consisting of the second color, a fourth pattern divided by a second diagonal line therein into one site consisting of the second color, a fifth pattern divided by the first diagonal line into one site consisting of the second color and the other consisting of the first color, and a sixth pattern divided by the second diagonal line into one site consisting of the second color and the other consisting of the first color.

By displaying the two-dimensional management pattern in a specified range, an information display tag can be formed on which information is efficiently displayed as a two-dimensional code.

The information display tag described is read as an image, and the information contained in the information display tag is detected based on the read image. When the information contained in the information display tag is detected from the read image, the density or color of a plurality of sites of the image is detected, and the sites are determined to be different when they have different densities or colors. Since a plurality of sites is determined using the detected density or color as described above, different sites can be determined, and the information about the object can be detected based on the results of the determination. Consequently, information can be obtained appropriately from the displayed two-dimensional management pattern.

The information display tag can be read as an image, and the information contained in the information display tag is detected based on the read image. When the information contained in the information display tag is detected based on the read image, the density or color of a plurality of sites within the region in which the unit pattern is displayed is detected to determine the relationship among the densities or colors corresponding to the respective sites. Accordingly, the distribution of the densities or colors in the unit pattern can be determined, and the unit pattern can be identified according to the distribution of the densities or colors based on the relationship determined. Thus, the information about the object can be detected based on the results of the determination. The identification of the unit pattern can be performed by detecting the density or color of the two sites of the unit pattern divided by the diagonal line therein, that is, the first density or color of one site and the second density or color of the other, determining the difference between the first density or color and the second density or color, comparing the difference with the locational relationship between one site and the other to determine the relationship among the densities or colors corresponding to the plurality of sites, and identifying the unit pattern based on the relationship determined.

The information display tag can be read as an image, and the information contained in the information display tag is detected based on the read image. To detect the information about the object based on the read image, if a converted image is formed by conversion in such a way that very small regions of about the same density or color that differ from that of surrounding regions will have their density or color changed to that of the surrounding regions, and the converted image is spatially differentiated to obtain a differentiated image, then the contour of the first region is extracted using the differentiated image, and the location and direction of the two-dimensional management patterns can be identified based on the extracted contour.

The above image processing method can be implemented by the image processing device. That is, an image pickup means is used to pick up an image including the information display tag in which the two-dimensional management pattern is displayed. An image conversion means forms a converted image obtained by conversion in such a way that very small regions of about the same density or color that differ from that of surrounding regions will have their density or color changed to that of the surrounding regions based on the picked-up image. When this converted image is formed, the very small regions of about the same density or color are preferably canceled. In addition, when the converted image is formed, further conversion is preferably performed to highlight the change in density or color at the boundary of different regions. A preprocessing means comprises a contour extraction means for spatially differentiating the converted image to obtain a differentiated image, and then extracting the contour of the first region using the differentiated image. A tag location detection means detects the location and direction of the two-dimensional management pattern based on the extracted contour. A region setting means sets the second and third regions based on the detected location and direction and also sets the region in which the unit pattern is displayed. A cell data analysis means detects the density or color of a plurality of sites within the region in which the unit pattern is displayed to determine the relationship among the densities or colors corresponding to the respective sites, identifies the individual unit patterns based on the relationship determined, and analyzes the information contained in the information display tag based on the arrangement of the multiple types of unit patterns identified.

It is an object of the present invention to provide a two-dimensional management pattern which enables the efficient two-dimensional display of information about an object.

In addition to the above object, it is an object of the present invention to obtain an information display tag on which information is efficiently displayed as a two-dimensional code.

Further, in addition to the above objects, it is an object of the present invention to obtain an information processing method and device wherein information can be appropriately obtained from a displayed two-dimensional management pattern.

The foregoing and other advantages of the present invention will be apparent to those skilled in the art of information handling in view of the accompanying drawings, description of the invention, and appended claims.

DESCRIPTION OF THE PREFERRED EMBODIMENTS

The embodiment of the present invention will now be described in detail with reference to the accompanying drawings. In this embodiment, the present invention is applied to a management system in which the management of a warehouse in a plant is performed using an information recording medium (hereinafter referred to as a two-dimensional tag) such as a seal on which coded information about a product is displayed as a two-dimensional pattern. Further, in this embodiment, description is made of a case in which, to form a two-dimensional tag, a two-dimensional pattern (a binary density pattern) is represented by different densities which can largely be classified by black and white corresponding to the darkness and lightness of the brightness involved.

Figure 5:
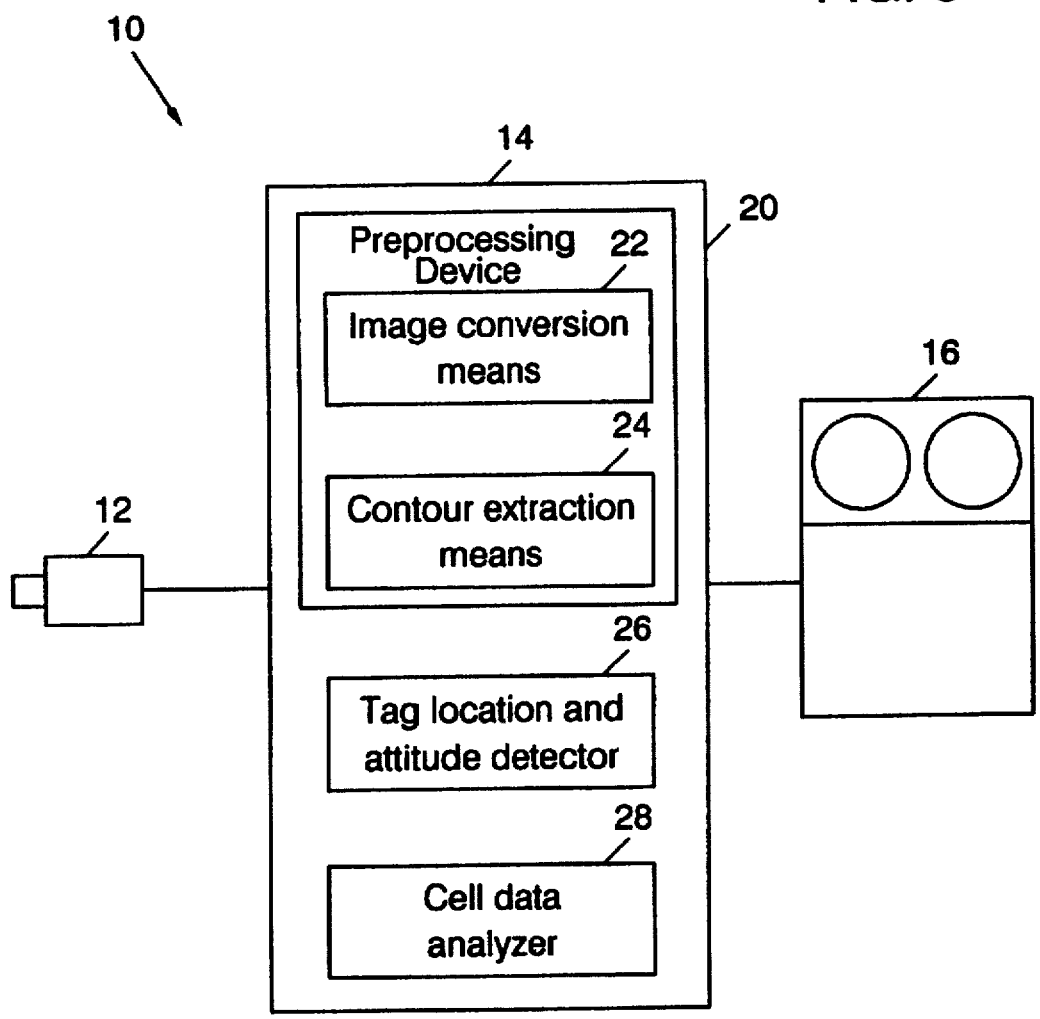
FIG. 5 is a block diagram showing the conceptual construction of the management system related to the embodiment of the present invention.

As shown in FIG. 5, a management system 10 comprises a CCD camera 12 for picking up an image including an object such as the product to be managed, a two-dimensional tag reader 14 formed by an image processing device including a microcomputer, and a host computer 16 for overall management of an object such as a product. The two-dimensional tag reader 14 comprises a preprocessing device 20 including an image conversion means 22 for preprocessing the image picked up by the CCD camera 12 and a contour extraction means 24, a tag location and attitude detector 26 for detecting the location and attitude of a two-dimensional tag, and a cell data analyzer 28 for analyzing the data recorded in the two-dimensional tag by the detected location and attitude.

The following description is made of the two-dimensional tag in which coded information used for the management system 10 of this embodiment is displayed, and a pattern for displaying the value of information in a region which is a unit element of the two-dimensional tag, or a region for displaying the value of coded information (hereinafter referred to as a data cell).

In the conventional method using a two-dimensional code, since a reading sensor detects a data region, the outermost circumference is used as a data frame for detecting the data region, but the outermost circumference has a large data capacity, and the efficiency is low if it is used only for detecting the data region. In addition, if the data frame is provided in the outer circumference, a quiet zone for identifying the data frame is required around it.

Accordingly, in this embodiment, as described later, a region for identifying the location and attitude of a two-dimensional tag is provided in the center thereof thereby to allow the efficient two-dimensional display of information about an object, and a region as a reference for starting the reading of the coded information in the two-dimensional tag. The two-dimensional tag is described in detail below.

Figure 1:
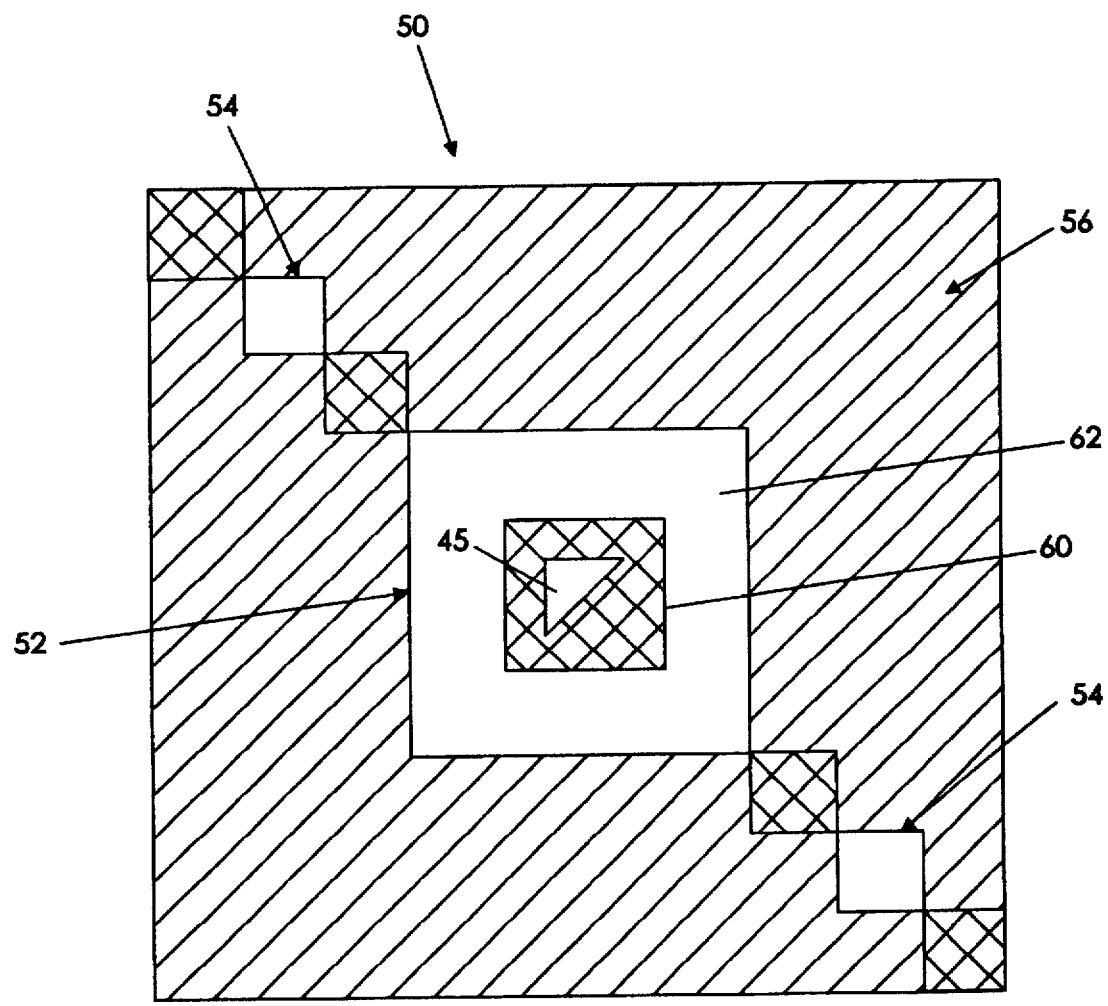
FIG. 1 is an image diagram showing the two-dimensional pattern related to the embodiment of the present invention.
Figure 4:
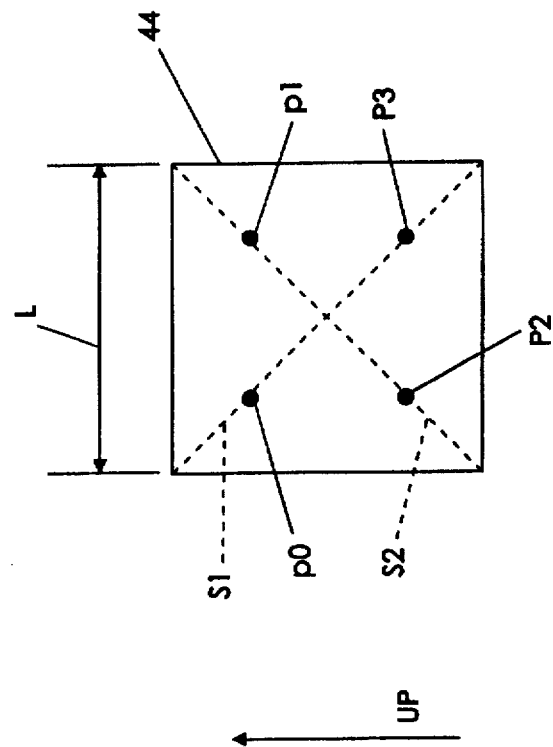
FIG. 4 is an image diagram showing the sample points in a data cell.

As shown in FIG. 1, a conceptual two-dimensional pattern (hereinafter, referred to as a reserved pattern) 50 comprises a first region 52 for identifying the location and attitude of the reserved pattern 50, a second region 54 for identifying the location for starting the reading of the information coded in the reserved pattern 50, and a third region 56 for displaying the coded information about an object. Each region of the reserved pattern 50 is formed with a size consisting of a plurality of data cells, the unit of which is a square data cell 44 whose side has predetermined length L (see FIG. 4).

The first region 52 consists of a location reference region 60 shaped in a square corresponding to four data cells 44 in size, and an identification region 62 having the size of one data cell and contiguous to the region 60. In substantially the center of the location reference region 60 is placed a data cell 45 having a shape equal to or larger than the data cell 44. The data cell 45 is divided by a diagonal line therein into one region (a triangular region) which is white and the other which is black, and the location reference region 60 is also black except for the data cell 45. In addition, the data cells in the identification region 62 are all white. A reference pattern for positioning the reserved pattern 50 is formed by the pattern constructed by black and white in the location reference region 60 and the identification region 62. That is, the square region corresponding substantially to the size of four data cells 44 functions to display the pattern for detecting the location of the reserved pattern 50, and this square region is defined as the location of the reserved pattern 50. Thus, by detecting the square region, the location of a two-dimensional tag in which the reserved pattern 50 is displayed can be detected. Simultaneously, the white region of the regions divided by the diagonal line of the data cell 45 functions to display the pattern for detecting the starting location of the reserved pattern 50, and the data cell in the direction of the triangle in the white triangular region is defined as the starting location of the coded information on the reserved pattern 50. As a consequence, the starting location (data cell) of the coded information can be detected by detecting the white triangular region and identifying the vertex of the triangle.

The second region 54 is to restrict the rotation (detect the attitude) of the reserved pattern 50, and has predetermined patterns arranged from the first region 52 to the outer circumference of the reserved pattern 50. In this embodiment, data cells are formed in such a way that black and white patterns appear alternately on a straight line (a diagonal line of the reserved pattern 50) between the starting location detected in the first region 52 and one data cell 44 located in a corner of the reserved pattern 50. That is, the data cells are formed so that the data cell 44 at the starting location is black since it is adjacent to the inside of the identification region 62 of a data cell 44 which is all white, and the data cell 44 at the next location is white, and so on. Accordingly, by detecting the second region 54 formed so that black and white appear alternately from the staring location, the rotation of the reserved region 50 can be detected and the attitude of the two-dimensional tag on which the reserved pattern is displayed can be detected and corrected.

The third region 56 is a region for displaying coded information, the details of which are described later, and it displays values corresponding to information in data cells 44 as patterns. In this case, patterns are sequentially arranged for each data cell 44 from the starting location.

In addition, the size of one data cell can be detected from the length of one side of the square in the center and the diagonal length of the black and white alternating patterns extending from a square corner of the square. Further, it is set so that data cells 44 are read out in response to the rotation in a predetermined fixed direction either left or right from the starting location, and the number of turns of the data cells 44 is displayed by the values in the first several data cells 44.

Figure 2:
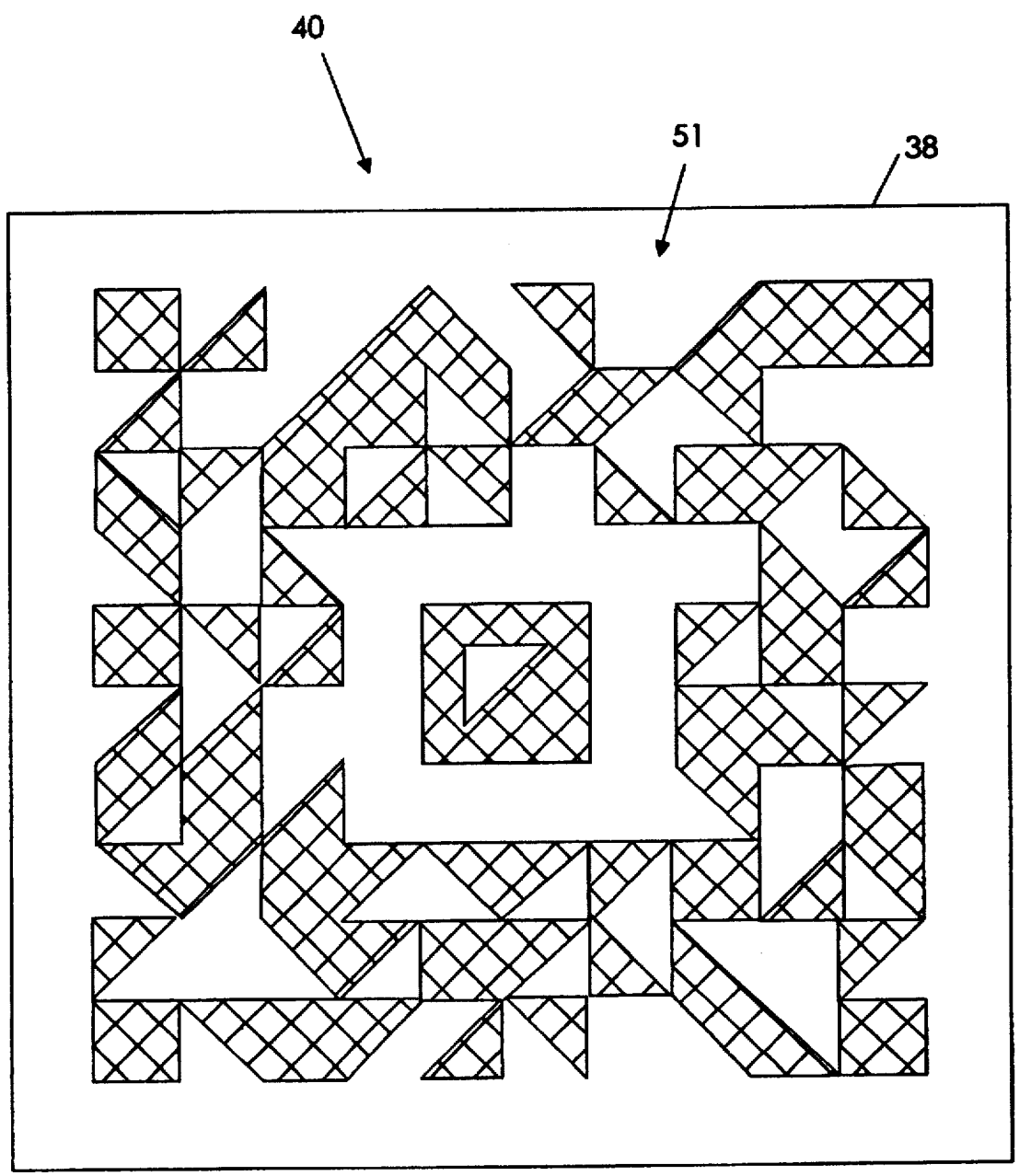
FIG. 2 is an image diagram showing the two-dimensional tag related to the embodiment of the present invention.

Using the reserved pattern 50 consisting of the first region 52, second region 54, and third region 56, a two-dimensional pattern is formed so as to correspond to the information about an object and displayed in an information display medium 38 such as a seal to form a two-dimensional tag 40. FIG. 2 shows an example of the two-dimensional tag in which a two-dimensional pattern 51 set according to some information is displayed.

As described above, in this embodiment, the positioning of the two-dimensional tag is performed in the first region in the center of the two-dimensional tag. With the patterns extending straight in the diagonal direction from the first region of the positioned two-dimensional tag, the attitude is corrected and a restriction is placed on the rotation of the two-dimensional tag. This allows the data region to be set without providing a data frame in the outer circumference, which thus eliminates the quiet zone.

Accordingly, the positioning can be performed in the center of the data region, and the rotation can be corrected by using the data cells of the diagonal elements. Thus, the data region of the two-dimensional tag can be formed with the number of data cells smaller than that used in the conventional method. Although it is expected that a pattern of the same shape as the square region in the center may also conceivably appear in the data region, the central pattern must fulfill all of the pattern requirements representing the starting location within the square, the white region around the square, and the black and white patterns on the diagonal line, and thus the central portion is not recognized erroneously in the data region.

The pattern in the data cell 44 for displaying coded information is described in detail as follows: The conventional data cell for representing the value of coded information is often shaped in a square in view of the degree of freedom of rotation, and the uniformity of density, and the inside of the data cell consists of a density corresponding to brightness (dark or light) which is black or white, and each value of one bit, "1" or "0", is made to correspond to the density (white or black) corresponding to the two types of brightness. For reading the data cell 44, a threshold value is required for distinguishing the black level and the white level. In consequence, in the boundary portion (the vicinity of the boundary) between the white data cell 44 and the black data cell 44, the read brightness (density) is averaged and the sensor output becomes an intermediate value. Thus, if the size of the data cell 44 is set to nearly the same size as the resolution of the sensor, the sensor output often takes an intermediate value, and hence there is no margin for the threshold value and it is difficult to distinguish black and white. Accordingly, the data cell requires a size three to five times the sensor resolution. For instance, in the CCD camera 12 which is an example of the sensor for reading a two-dimensional tag 40, the size of the minimum data cell 44 must be 3×3 to 5×5 pixels.

In this embodiment, to increase the amount of recordable information while maintaining the degree of freedom in reading, the amount of information which can be recorded in one data cell is increased by positively making use of changes in the brightness of one data cell. That is, assuming that the density distribution in the square data cell 44 is a pattern 46, six values can be represented by one data cell by using not only the two uniform densities corresponding to brightness of black or white, but also patterns in which densities coexist which correspond to the brightness of the black and white in the diagonal regions in one data cell 44 (the respective regions divided by one diagonal line of the data cell 44).

Figure 3:
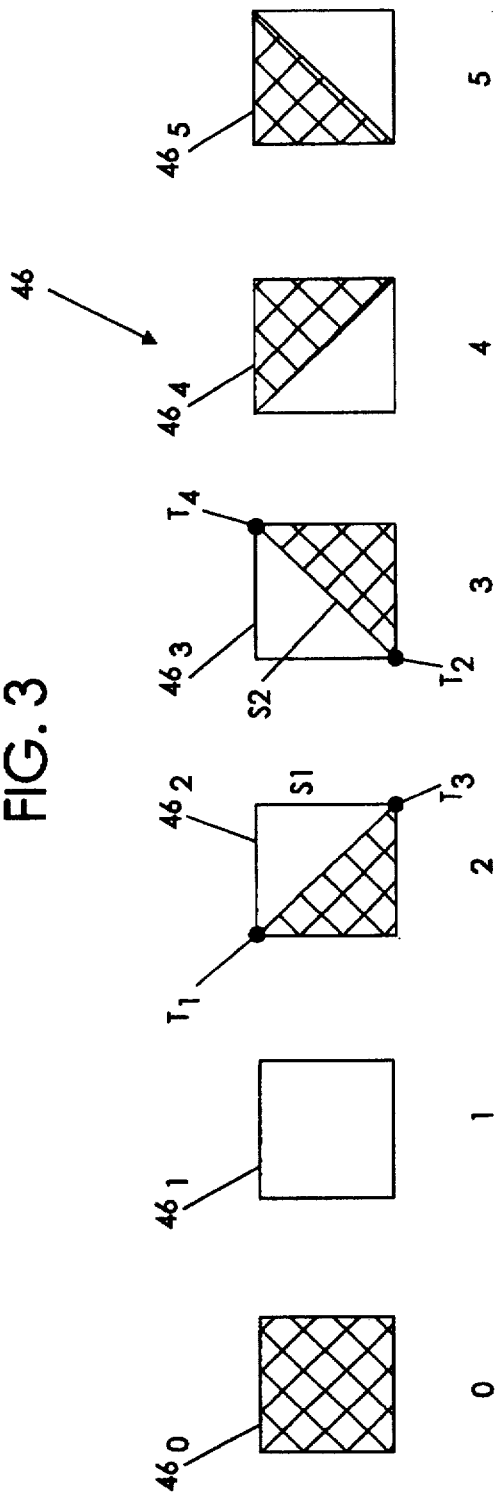
FIG. 3 is an image diagram showing the patterns in a data cell related to the embodiment of the present invention.

As shown in FIG. 3, "1" is assigned to a value corresponding to a high-density pattern $46_0$ (black) which is a pattern 46 in one data cell 44 and has a substantially uniform dark brightness, and "1" is assigned to a value corresponding to a low-density pattern $46_1$ (white) which has a substantially uniform light brightness. "2" is assigned to a value corresponding to a pattern $46_2$ divided by a diagonal line $S_1$ between one apex of the pattern 46 and the apex in the diagonal direction (in FIG. 3, upper left-hand corner point $T_1$ and lower right-hand point $T_3$) into one site (in FIG. 3, the lower site) which has a high density providing a substantially uniform dark brightness, and the other (in FIG. 3, the upper site) which has a low density providing a substantially light brightness. "3" is assigned to a value corresponding to a pattern $6_3$ divided by diagonal line $S_2$ between one apex different from the pattern $46_2$ of the pattern 46 and the apex in the diagonal direction (in FIG. 3, lower left-hand corner point $T_2$ and upper right-hand point $T_4$) into one site (in FIG. 3, the lower site) which has a high density providing a substantially uniform dark brightness, and the other (in FIG. 3, the upper site) which has a low density providing a substantially light brightness. "4" is assigned to a value corresponding to a pattern $46_4$ which has a density distribution obtained by the inversion of that of the pattern $46_2$, and "5" is assigned to a value corresponding to a pattern $46_5$ which has a density distribution obtained by inversion of that of the pattern $46_3$. As described above, six patterns are formed in the data cell 44, which is one of the elements of the two-dimensional tag, enabling the representation of six values (0 to 5) as values for information. Thus, information can be arranged and expressed in a hexadic notation.

A comparison is made between the information density in one data cell of this embodiment using the patterns which can be provided by a hexadic representation and the conventional information density in one data cell. On the one hand, if one side of the square pixel of the image input device is assumed to be one, the maximum length covered by the pixel is 2 since the two-dimensional tag may rotate. For at least one pixel to cover the data cell, the data cell needs to be 2×2 at minimum. On the other hand, for the data cell of this embodiment, the diagonal pixel is used in determination, and for at least one pixel to cover the data cell of the diagonal pixel, the data cells need to be 3×2 at a minimum in the worst case, but it is not necessary to determine whether the diagonal pixel is white or black in this embodiment, as described later, and it is only required that the difference of the diagonal pixel is sufficient. 2.5×2 suffices for the size of the data cell at this point. To compare the amount of information per unit area, the minimum area of the data cell is 8 in the conventional method, whereas it is 12.5 in this embodiment, and if a comparison is made in information density, the conventional method:this embodiment=2/8::6/12.5 =1:1.92 and thus this embodiment has an information density per data cell of about two times that of the conventional one. In the conventional method, on the one hand, the minimum length of the side of the data cell is made longer to provide a little margin thereby for increasing the effective detection accuracy. In this embodiment, on the other hand, although the details are provided later, the determination is made by the direction of the gradient of the difference rather than a simple determination of black or white, and thus the side needs not be long and the density difference becomes larger, so that the information density in one data cell 44 will increase.

The action of this embodiment will now be described together with the operation of the two-dimensional tag reader 14.

Figure 9:
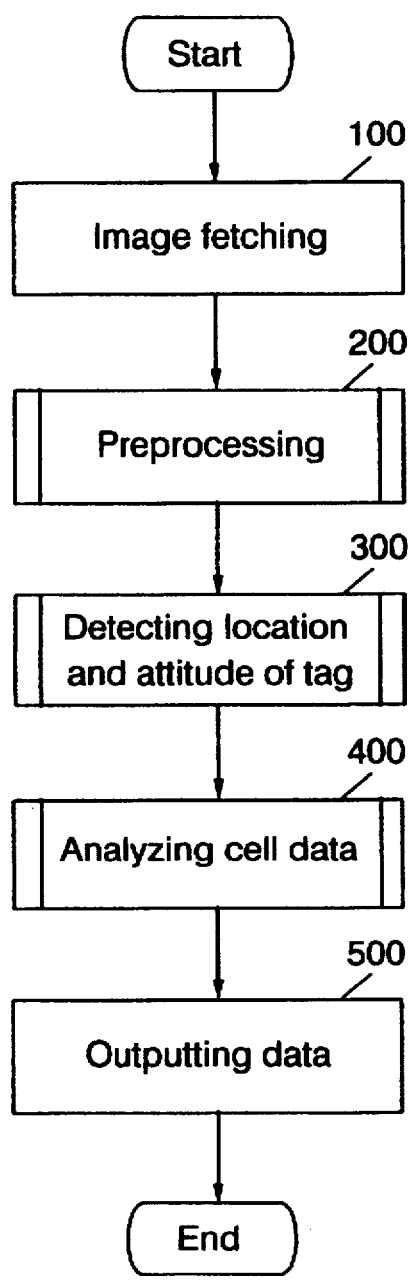
FIG. 9 is a flowchart showing the main routine executed in the two-dimensional tag reader.

When an instruction signal instructing the reading of a two-dimensional tag is input from the host computer 16 for managing an object such as a product, in the two-dimensional tag reader 14, the main routine shown in FIG. 9 is executed.

In step 100 in FIG. 9, an image 70 (see FIG. 6) picked up by the CCD camera 12 is read and stored in a memory, not shown, and thereafter in the next step 200, the preprocessing of the read image 70 (stored image) is performed. The preprocessing includes image processing functions such as smoothing and filter processing, and it is performed in the preprocessing device 20 (the details of which are described later). Accordingly, in step 200, the preprocessing device 20 is instructed to execute the processing, and to use the image preprocessed in the preprocessing device 20 as an image after preprocessing, the image data of the image after preprocessing is input.

In the next step 300, using the image after preprocessing a tag location and attitude detection process is performed. The tag location and attitude detection process is image processing for determining the location and attitude of the two-dimensional tag 40 in the image after preprocessing, and it is performed in the tag location and attitude detector 26 (the details of which are described later). Accordingly, in step 300, the tag location and attitude detector 26 is instructed to execute the processing, and location and attitude data is input representing the location and attitude of the two-dimensional tag 40 obtained in the tag location and attitude detector 26.

In step 400, from the two-dimensional tag 40 whose location and attitude were thus determined, a cell data analysis is carried out using the location and attitude data and the image 70 of the two-dimensional tag 40 which was originally read. The cell data analysis process is a process for performing a cell data analysis to obtain the value of each data cell 44, and generating analysis data corresponding to the information coded from the value obtained for each data cell 44, which processing is performed in the cell data analyzer 28 (the details of which are described later). Accordingly, in the step 400, the cell data analyzer 28 is instructed to execute the processing, and the analysis data obtained in the cell data analyzer 28 is input.

After the analysis of the value of each data cell 44 and the generation of the analysis data are terminated, and, in the next step 500, analysis data corresponding to the coded information is output to the host computer 16, completing the main routine.

(Step 200)

The details of processing in the preprocessing device 20 in step 200 of FIG. 9 is described below. The processing in step 200 is to perform a conversion process of the image 70 picked up as an image for detection, thereby facilitating the detection of the location and attitude of the two-dimensional tag 40 from the picked-up image 70 in the tag location and attitude detector 26 to be described later.

That is, generally, noise is superimposed on the image picked up by the CCD camera 12, it is difficult to transform one white element (hereinafter, referred to as a black pixel) corresponding to white to a binary value without error with one CCD element of the CCD camera 12 as the unit element. Thus, in this embodiment, the smoothing of the image 70 is performed, and to prevent the contrast of the boundary region between the black and white regions from being attenuated, minimum value filter processing and maximum value filter processing are performed as described later. The minimum value filter process and maximum value filter process are processes for substituting image data which becomes the minimum or maximum value for the central image data in the small region around any image data, which processing is applied to the picked-up image.

Figure 6:
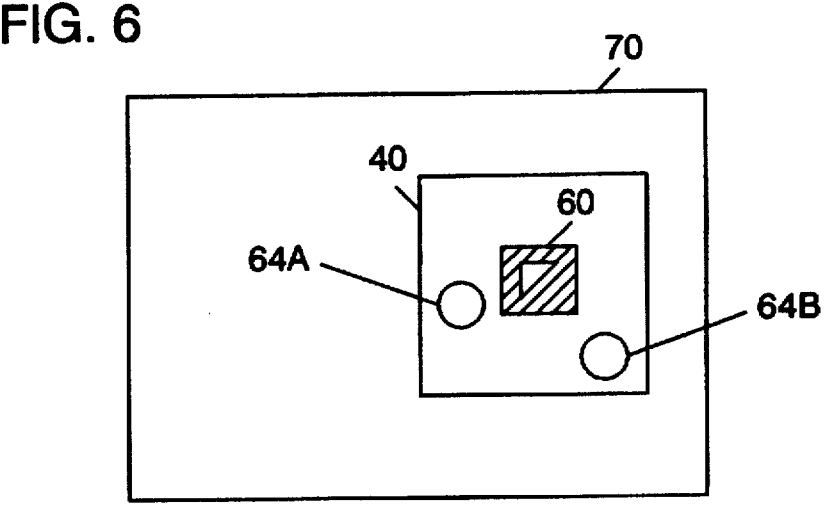
FIG. 6 is an image diagram showing an image picked up by a CCD camera.
Figure 7B:
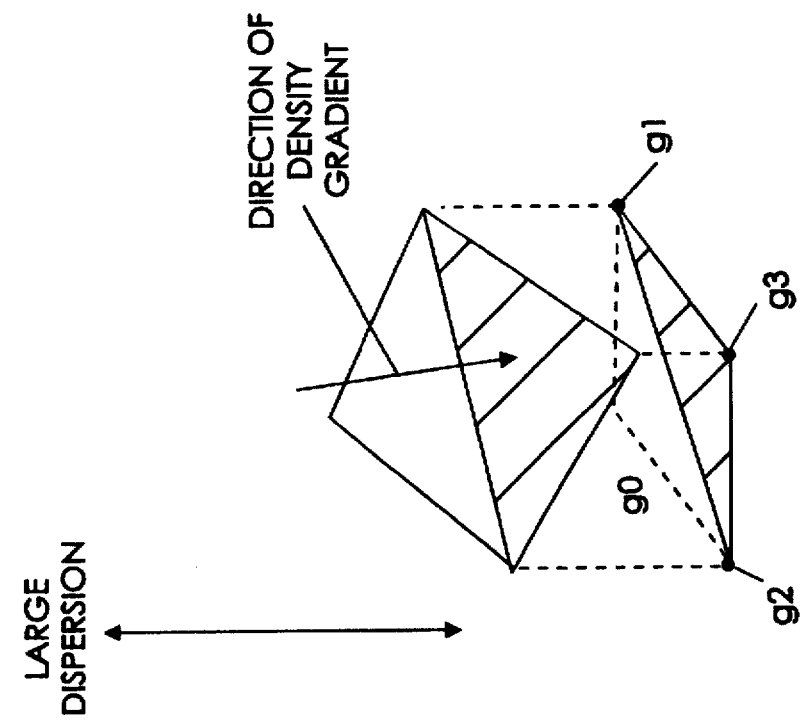
FIG. 7 is an explanatory view for explaining the identification of the pattern of a data cell having a brightness distribution, in which (A) is related to a data cell in the center of the two-dimensional tag, and (B) is related to a data cell in the peripheral portion of the two-dimensional tag.
Figure 7A:
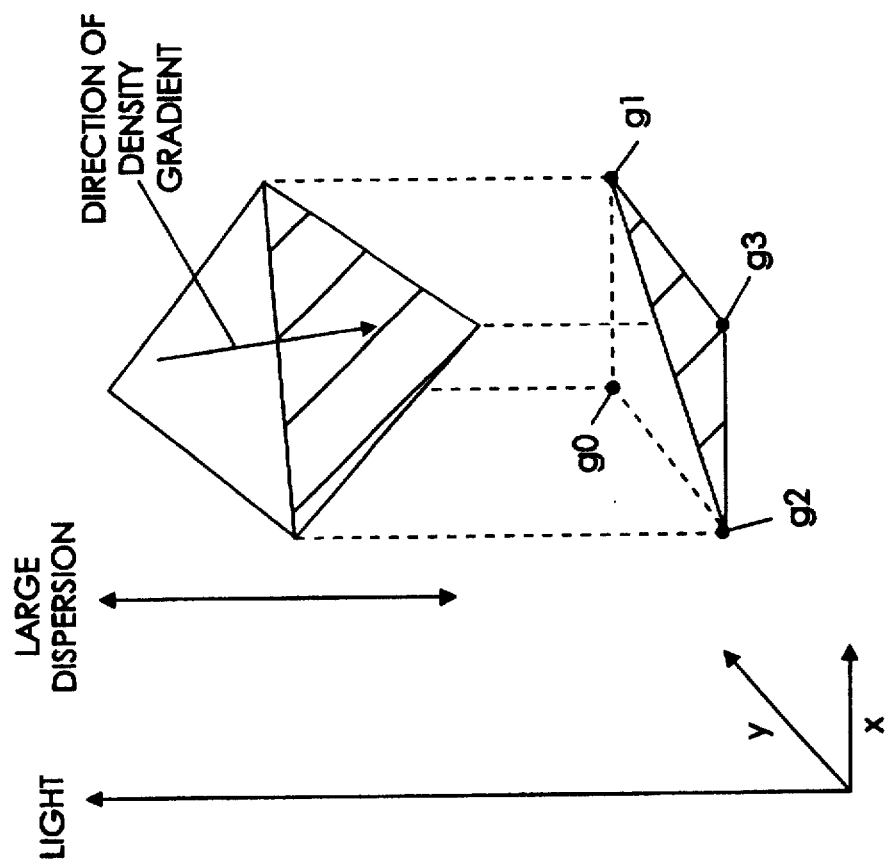
Figure 8A:
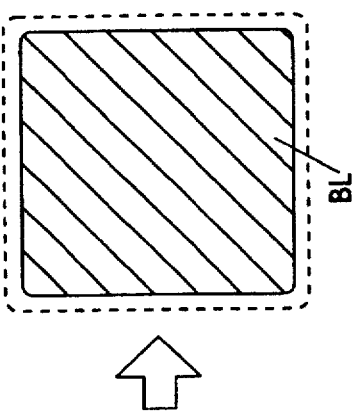
FIG. 8 is an explanatory view for explaining the minimum value filter process and the maximum value filter process, in which (A) is an image of part of the original image, (B) is an image after the minimum value filter process, (C) is an image after the additional minimum value filter process, (D) is an image after the maximum value filter process, (E) is a brightness vs. location characteristic graph in the minimum value filter process, (F) is a brightness vs. location characteristic graph in the further minimum value filter process, and (G) is a brightness vs. location characteristic graph in the maximum value filter process.
Figure 8B:
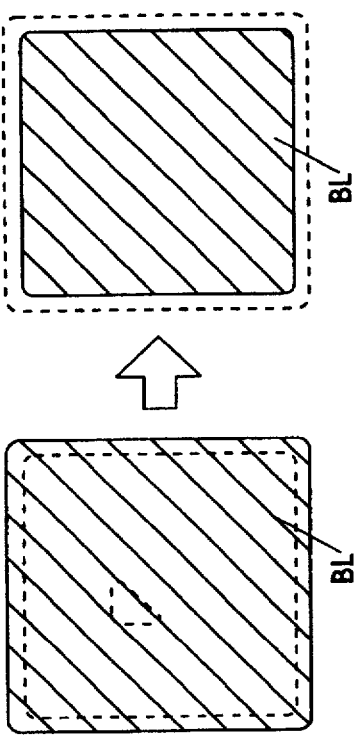
Figure 8C:
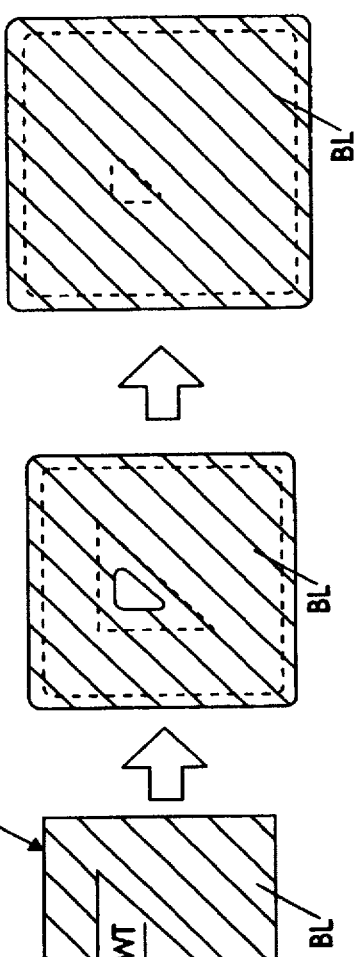
Figure 8D:
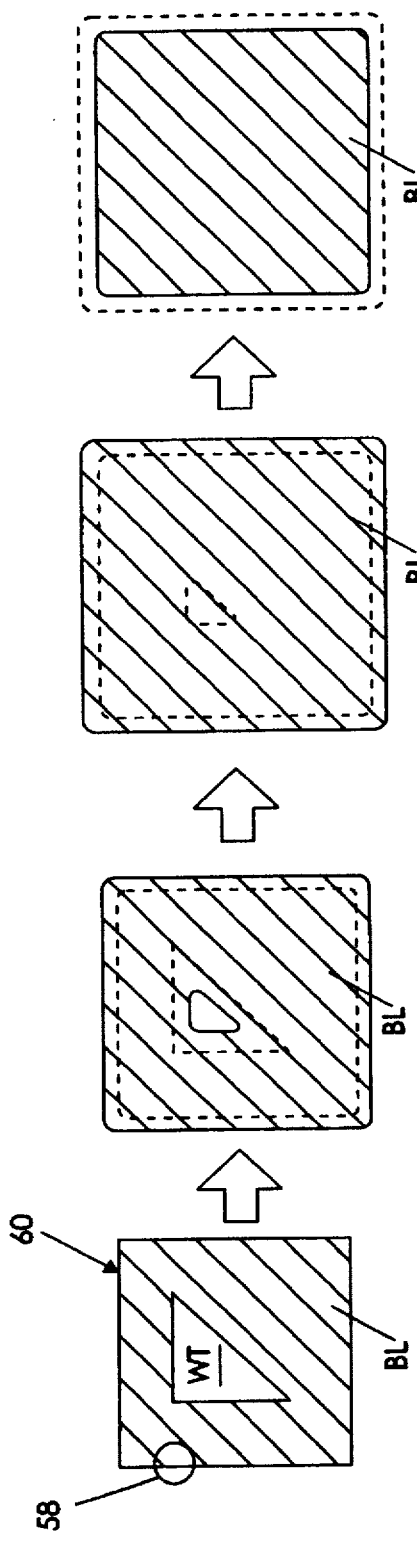
Figure 8E:
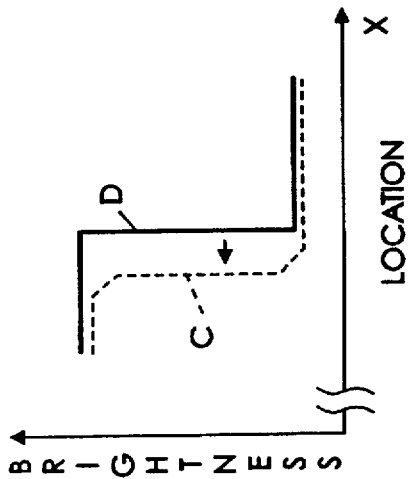
Figure 8F:
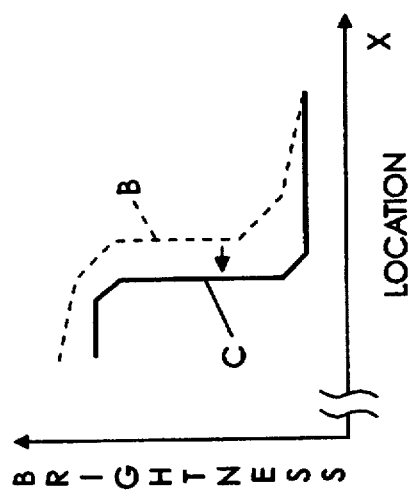
Figure 8G:
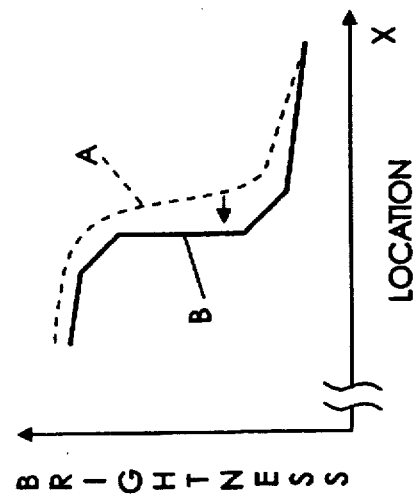
Figure 10:
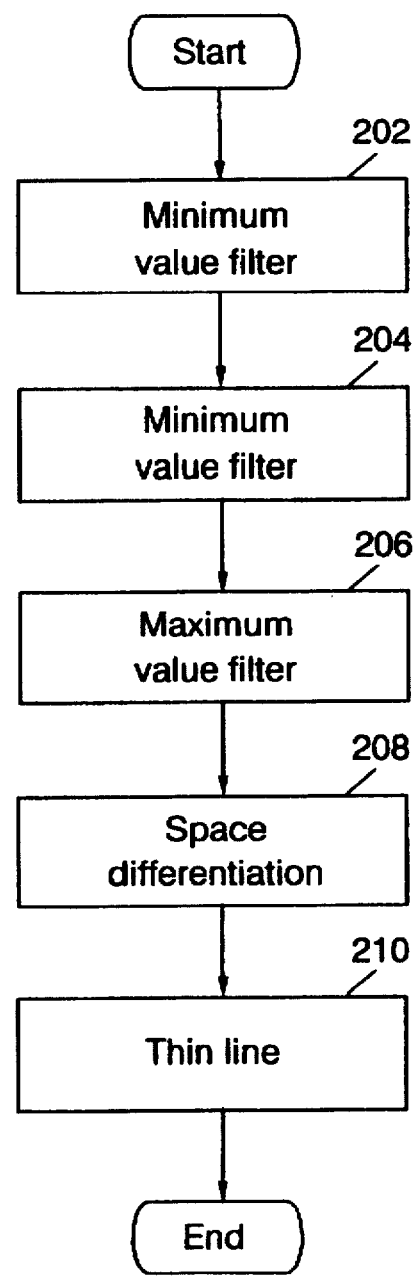
FIG. 10 is a flowchart showing the details of step 200 in FIG. 9, or the routine executed in the preprocessing device.

First, in step 202 in FIG. 10, the image 70 picked up by the CCD camera 12 is submitted to the minimum value filter process to expand the black region consisting of a group of black elements. Subsequently, in step 204, it is submitted to the minimum value filter process to expand the black region consisting of a group of black elements. In the next step 206, the maximum value filter processing is performed to expand the white region consisting of a group of white pixels. For instance, as shown in FIG. 6, a description is made using an image 70 obtained by picking up a two-dimensional tag 40 having a location reference region 60. In the location reference region 60 (see FIG. 8 (A)), the black region, BL, is expanded by the minimum value filter process, and the white region, WT, which is a data cell 45, contracts (see FIG. 8 (B)). In the subsequent minimum value filter process, black region BL further expands and white region WT further contracts (see FIG. 8 (C)). Thereafter, by performing the maximum value filter process, white region WT expands and black region BL contracts (see FIG. 8 (D)). That is, brightness characteristic A showing the relationship between the location and brightness of the vicinity of a small region 58 in the first region 52 shifts to brightness characteristic B (see FIG. 8 (E)). In the subsequent minimum value filter process, it further shifts to brightness characteristic C (see FIG. 8 (F)). Thereafter, by performing the maximum value filter process, it shifts to brightness characteristic D (see FIG. 8 (G)).

Accordingly, an image having a high contrast can be obtained in which, as compared with the originally read image, the black region expands once, the corners are crushed, and the small white region in the black region degenerates and connects to the adjacent black region (see FIG. 8 (D)). This image is spatially differentiated in the next step 208, whereby the continuation of a region in which the differentiated value is not smaller than a specified value is obtained as a boundary line. In the next step 210, the boundary line is made into a thin line so that the width of the boundary line is one pixel under the resolution of the CCD camera 12.

By tracing a boundary line the inside of which contains only black pixels, a closed region can be obtained as a candidate for the location reference region 60. Accordingly, in the tag location and attitude detector 26, as described later, after obtaining a closed region the inside of which contains only black pixels, the location and attitude of the two-dimensional tag 40 can be detected to correct the direction of the two-dimensional tag 40.

(Step 300)

The following description is related to the details of the process in the tag location and attitude detector 26 in step 300. Although, in step 200 above, there is the possibility that a plurality of closed regions is obtained, since the closed region to be extracted is formed in a substantially square shape in the first region 52 as the location reference region 60 by four data cells 44, it is only necessary to detect a pattern which is a square with high probability from the area, peripheral length, and secondary moment of the closed area. Thus, in step 300, the location and attitude of the two-dimensional tag 40 are detected by the existence of the location reference region 60 (center mark) in the picked up image 70 and the orientation of the data cell 45 in the location reference region.

Figure 11:
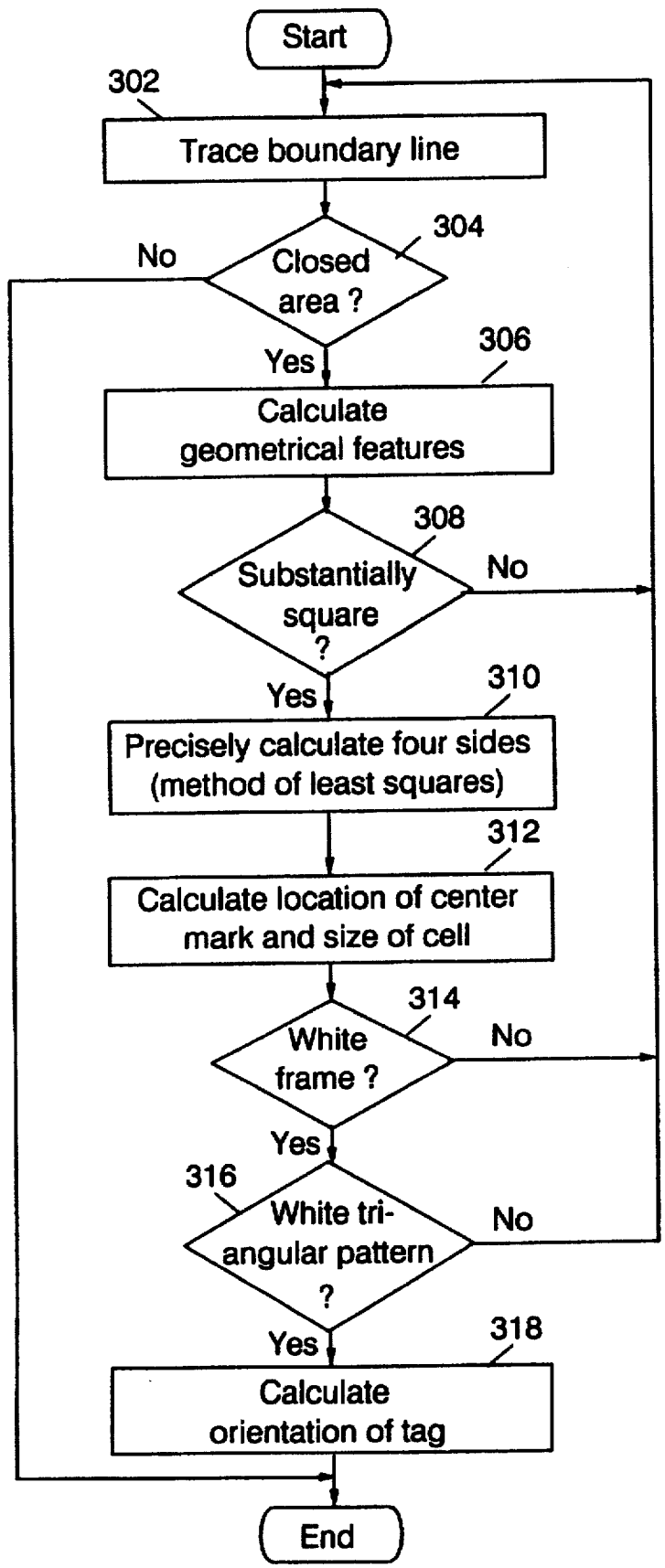
FIG. 11 is a flowchart showing the details of step 300 in FIG. 9, or the routine executed in the tag location and attitude detector.

In step 302 in FIG. 11, the boundary line made into a thin line as described above (step 210 in FIG. 10) is traced, and when the locus of it returns to the start point for tracing or the end point the process goes to step 304 assuming that tracing has terminated. In step 304, by determining whether or not the end point of the locus when traced has returned to the start point for tracing, it is determined whether or not there is a closed region formed by the boundary line. On the one hand, if the answer is negative, it is determined that the picked-up image includes no closed region as a candidate for the location reference region 60, and this routine is terminated. On the other hand, if the answer is positive, it is determined that the probability of the region in the boundary line traced in step 302 being a candidate for the location reference region 60 is high, step 306 is entered.

In step 306, after calculating the geometrical feature amounts such as the secondary moment of the closed area, in next step 308, by determining whether or not the obtained geometrical feature amounts represent amounts corresponding to a square, it is determined whether or not the closed region is substantially square. On the one hand, since the location reference region 60 is formed in a substantially square shape formed by four data cells 44, if the determination is negative, it is not a candidate for the location reference region 60, and the process returns to step 302 to extract the next candidate. On the other hand, if the determination is positive, the process goes to next step 310 where the sides of the closed region are precisely calculated. That is, since the closed region is obtained so as to cover the actual square pattern, by changing the boundary region of the raw data reached for the first time toward the inside of the closed region to a segment by the method of least squares, the precise four sides of the square are calculated. In next step 312, the location of the location reference region 60 (center mark) and the size of the data cell are calculated. That is, from the location of the precise four sides of the square region on the image, the location of the closed region obtained as the square region is calculated and the size of the data cell 44 is estimated from the length of one side of the closed region.

In step 314, on the one hand it is determined whether or not, in one data cell around the closed region as a candidate for the location reference region 60, a white frame is formed which consists of a group of white pixels having a large density difference as compared with the black pixels in the closed region, and, if the answer is negative, it is not the location reference region 60 formed in the first region 52, returning to step 302 to extract the next candidate. On the other hand, if the answer is positive, since the probability of it being the location reference region 60 formed in the first region 52 is high, in next step 316, it is determined whether or not there is a white triangular region (hereinafter, referred to as a white triangular pattern) corresponding to the data cell 45 in the closed region, and if there is no white triangular pattern, the data cell 45 is not included in the location reference region 60 and it is not the location reference region 60 in the first region 52, and thus the process returns to step 302 to extract the next candidate. When there is a white triangular pattern, it is the first region 52 and the determination is positive, and in next step 318, by calculating the orientation of the two-dimensional tag using the white triangular pattern, the attitude of the two-dimensional tag is detected and the size of the data cell 44 is determined.

Thus, if, finally, there is a white triangular pattern in the closed region, it is identified as the first region 52 which is formed by the closed region containing the white triangular region and the surrounding white frame. Also in step 318, if the direction which the white triangular pattern in the closed region points to is detected, the starting location of the data cell 44 can be detected. That is, the white triangular pattern indicates the direction (diagonal direction) of the data cell as the start point of circle by the direction pointed to by the vertex of the isosceles triangle. Thus, the data cells 44 on the prolonged line in the diagonal direction exist in the second region 54 for determining the attitude of the two-dimensional tag. Consequently, once the starting location of the data cells 44 can be detected, by confirming that the data cells 44 on the prolonged line in that direction alternately appear outside the closed region, black and white, the second region 54 for determining the attitude of the two-dimensional tag can be identified. Accordingly, the direction of the two-dimensional tag can be corrected from the direction of the plurality of data cells 44 continuing from the starting location, and the size of the data cells 44 can be determined from the diagonal line length of the alternately appearing white data cells (pattern $46_1$) and black data cells (pattern $46_0$).

(Step 400)

Description is now made of the details of the process in the cell data analyzer 28 in step 400. Incidentally, in this embodiment, description is made of a case in which the subject data cells 44 are scanned clockwise in the two-dimensional tag 40.

Figure 12:
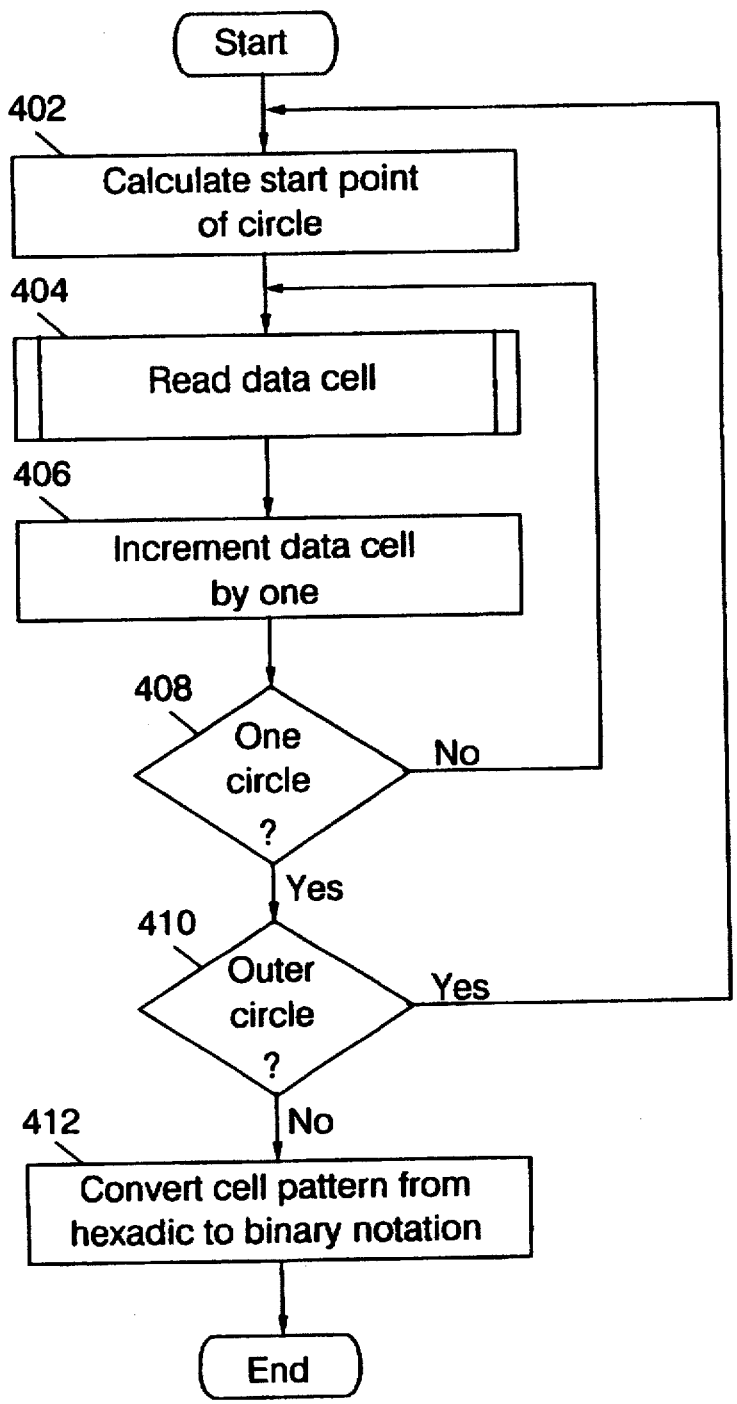
FIG. 12 is a flowchart showing the details of step 400 in FIG. 9, or the routine executed in the cell data analyzer.
Figure 14:
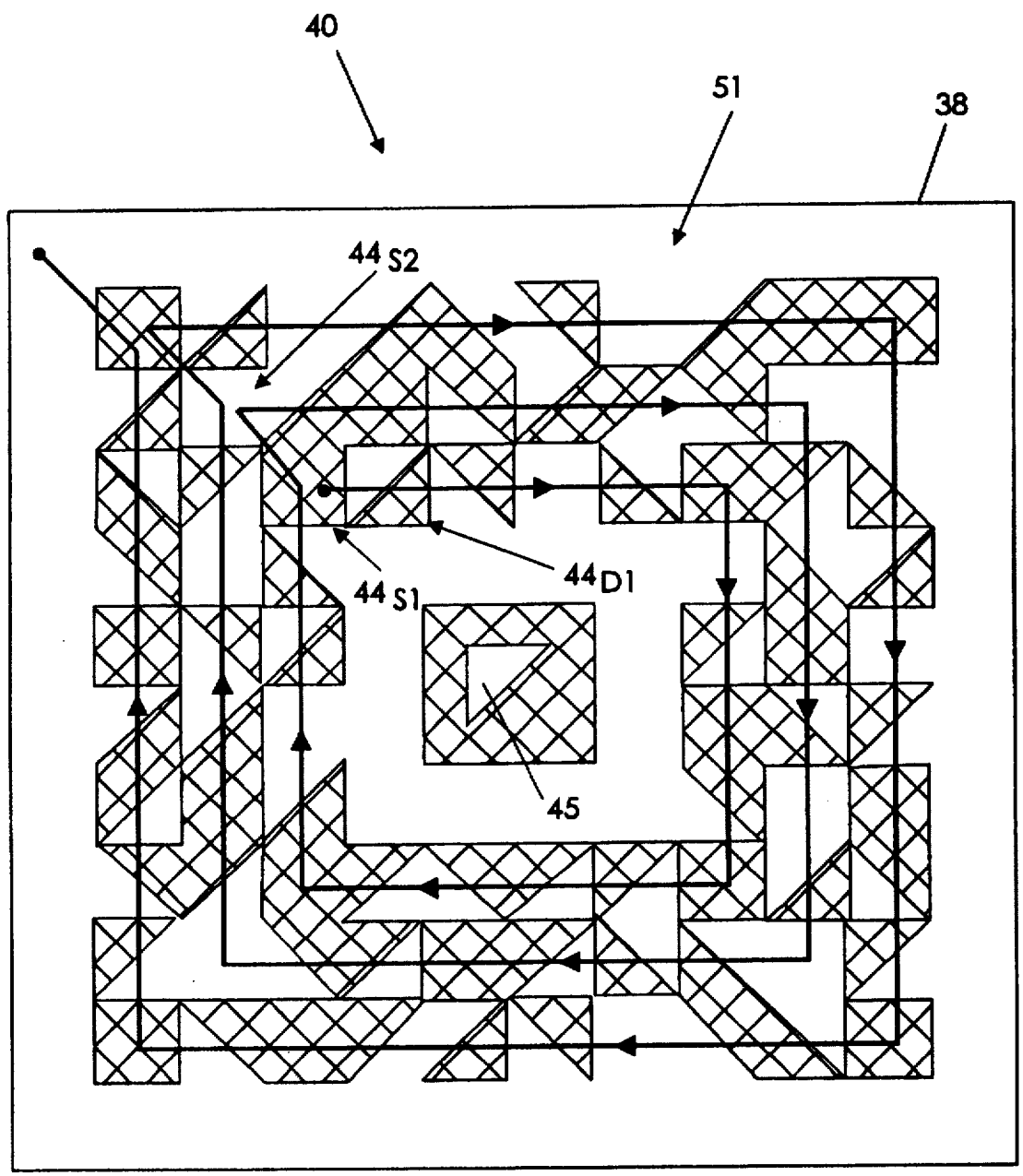
FIG. 14 is an explanatory view for explaining the process of reading information from the two-dimensional tag related to the embodiment.

In step 402 in FIG. 12, the starting point of the circle is calculated. The starting point of the circle for the first process is data cell $44_{S1}$ circumscribed on the identification region 62 (see FIG. 14). Since the subject data cells 44 are scanned clockwise (see the solid line in FIG. 14), the next data cell is a data cell $44_{D1}$ adjacent to the data cell $44_{S1}$. In addition, for the calculation of the starting point of the next circle after one circle on the two-dimensional tag 40 to be described later is terminated, the subject data cells are scanned in the direction toward the outer circumference along the prolonged line of the diagonal line disposed in the direction pointed to by the data cell 45 (data cell $44_{S2}$ adjacent to data cell $44_{S1}$).

In next step 404, the identification of the pattern of the subject data cell 44 by the pattern identification process (FIG. 13) to be described later is performed, and thereafter, in next step 406, the position of the data cell 44 is incremented clockwise by one for the pattern identification process of the next data cell 44. In next step 408, by determining whether or not the data cell 44 at the position incremented in step 406 is the starting point of the circle, it is determined whether or not the pattern identification process has completed one circle on the two-dimensional tag 40. If, on the one hand, the answer is negative, the process returns to step 404 to repeat the pattern identification process as described above. On the other hand, if the answer is positive, the process goes to step 410.

In step 410, on the one hand, by determining whether or not there is a data cell circumscribed on the starting point of the circle, if the determination is positive, the process returns to step 402 where, after calculating the starting point of the outer circle, the pattern identification process is repeated. On the other hand, if negative, since the pattern identification of all data cells from the two-dimensional tag 40 has been completed, in step 412, the cell array data of an array (hexadic array) of continuous hexadic values as data cell patterns is converted to an analysis data of an array (binary array) of continuous binary values, completing this routine.

The pattern identification process of the data cell 44 in step 404 is now described in detail.

In this embodiment, accounting for the case in which the image obtained by the CCD camera 12 is not picked up under uniform brightness, the brightness distribution of the picked-up data cell 44 is considered three-dimensional by brightness (I), a longitudinal position (y) on the image and a lateral position (x). That is, paying attention to the fact that a region (pattern) of different densities corresponds to the direction of the density gradient, the present invention identifies the pattern of the data cell 44 using dispersion and the average of brightness as described later. For instance, on the one hand, in an image 70 obtained by picking up a two-dimensional tag 40 illuminated with uneven brightness, as shown in FIG. 6, if the same pattern $46_3$ is displayed in a data cell $44a$ within a region 64A in the central portion and in a data cell $44b$ within a region 64B in the peripheral portion, a pixel value (brightness image data) of a totally light density gradient is obtained in the region 64A. On the other hand, the region 64B has a pixel value of a dark density gradient as compared with the region 64A. That is, for weighted mean values g0, g1, g2, and g3 obtained by averaging the pixel values (Brightness image data) of a specified number of surrounding pixels for each position of sample points p0, p1, p2, and p4 on diagonal lines $S_1$ and $S_2$ in the data cell 44 (see FIG. 4), the density gradient increases toward sample points p0 and p3 in both regions 64A and 64B as far as the pattern $46_3$ is concerned (see FIG. (A), (B)). As a consequence, if the dispersion or density gradient of the sample points in the data cell 44 is determined, the pattern displayed in the data cell 44 can be identified even if the two-dimensional tag 40 is illuminated with uneven brightness.

Figure 13:
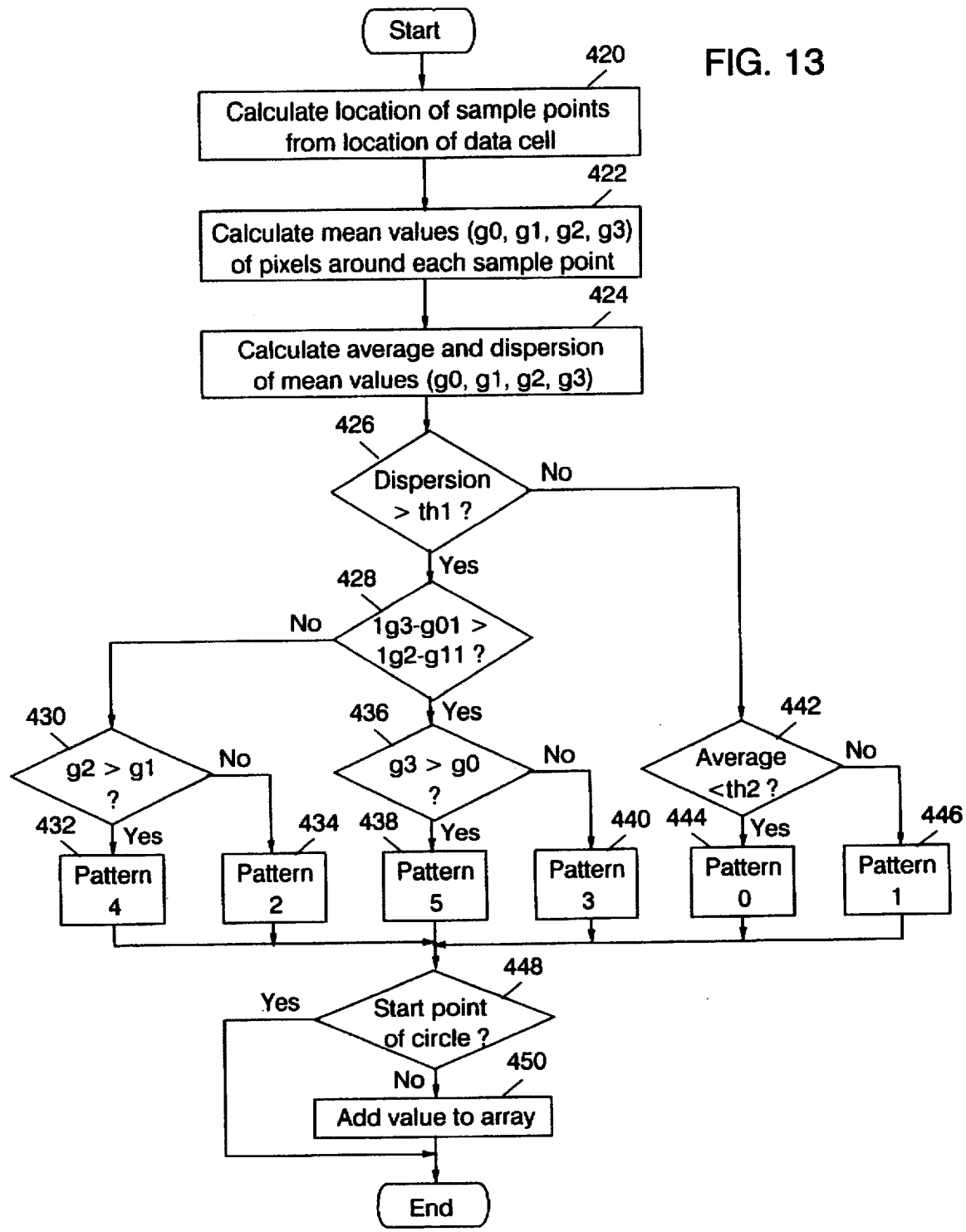
FIG. 13 is a flowchart showing the details of step 404 in FIG. 12, or the pattern identification routine of the data cell 44.

In step 420 in FIG. 13, each position of sample points p0, p1, p2, and p3 on the diagonal lines $S_1$ and $S_2$ in the data cell 44 at the location of the subject data cell 44 (see FIG. 4) is calculated. In the next step 422, for each sample point p0 to p3, the weighted mean values g0, g1, g2, and g3 obtained by averaging the pixel values (brightness image data) of a specified number of surrounding pixels are calculated. In the next step 424, an average AV, a value obtained by averaging the four mean values g0, g1, g2, and g3, and the dispersion Z of the mean values g0, g1, g2, and g3 are calculated.

In next step 426, it is determined whether or not obtained dispersion Σ has exceeded a threshold value th1. The determination in step 426 is for determining whether or not the pattern of the data cell 44 is a pattern of a substantially uniform density by the degree of the scattering of the density in the data cell 44. If the determination is negative, there is a substantially uniform brightness distribution because of the small density scattering in the data cell 44, and the pattern in the data cell 44 is the pattern $46_0$ or pattern $46_1$ which is white or black brightness (see FIG. 3). Thus, in next step 442, by determining whether or not the average AV is smaller than a threshold value th2 (AV<th2), it is determined whether or not it is a uniformly dark pattern. On the one hand, if it is determined to be a uniformly dark pattern, it is recognized to be the pattern $46_0$ in step 444. On the other hand, if the determination is negative, it is recognized to be the pattern $46_1$ in step 446.

If the determination is positive in above step 426, the pattern of the data cell 44 is formed with different brightness in the regions divided by the diagonal line, because the brightness scattering in the data cell 44 is large. Thus, in next step 428, by determining whether or not |g3−g0|>|g2−g1|, the determination is made as to whether the difference in brightness among the sample points on the two diagonal lines $S_1$ and $S_2$ is large or small. If the determination is positive, the amount of brightness change near sample points p0 and p3 is large and it is a pattern in which the data cell 44 is divided by diagonal line $S_2$ (see FIG. 4), and by determining whether or not g3>g0 in next step 436, the brightness of each divided region is determined. On the one hand, if the determination in step 436 is positive, the brightness in the vicinity of sample point p3 is stronger than that in the vicinity of the sample point p0, and thus it is determined to be the pattern $46_5$ in step 438. On the other hand, if the determination in step 436 is negative, the process goes to step 440 to determine that it is the pattern $46_3$.

If the determination in the above step 428 is negative, the amount of brightness change near the sample points p1 and p2 is large and it is a pattern in which the data cell 44 is divided by the diagonal line $S_1$, and thus, by determining whether or not g2>g1 in step 430, the brightness of each divided region is determined. On the one hand, if the determination in step 430 is positive, the brightness in the vicinity of the sample point p2 is stronger than that in the vicinity of the sample point p1, and thus the process goes to step 432 to determine that it is the pattern 464. On the other hand, if the determination in step 430 is negative, the process goes to step 434 to recognize it as the pattern $46_2$.

The pattern setting of the subject data cells 44 is terminated in this way: The process goes to step 448 where it is determined whether or not the subject data cell 44 is the data cell at the starting point. On the one hand, if the answer is positive, this routine is immediately terminated. On the other hand, if the answer is negative, since coded information about a product is displayed in the subject data cell 44, a value corresponding to the pattern is added to the array in step 450 to generate cell array data.

The white and black patterns $46_0$ to $46_5$ can thus be identified. The code corresponding to the coded information about a product includes 18 data cells if data cells 44 each can represent six patterns $46_0$ to $46_5$ form a code of one circle around the two-dimensional tag 40, 47 (=18+26) data cells for a code of double circles, and 81 (=18+26+34) data cells for a code of three circles. Accordingly, by making the values 0 to 5 correspond to the patterns $46_0$ to $46_5$, and clockwise reading these using hexadic notation, starting from the data cell 44 at the starting position depends on the orientation of the center, whereby corresponding symbols can be obtained. In this case, by providing the symbols for each circle with redundancy for error detection and correction such as a check sum to check if there is another circle outside it, the number of circles of that code can be determined and the reliability for the code reading can be ensured.

Thus, the host computer 16 can use the analysis data output from the two-dimensional tag reader 14 to manage an object such as a product.

In addition, threshold values th1 and th2 used above are not fixed values, but can be dynamically determined according to the distribution of the pixel values in all regions contained in the two-dimensional tag 40. That is, when detecting the first region 52, a density corresponding to black can be detected from the location reference region 60, and a density corresponding to white can be detected from the identification region 62. Further, since the patterns $46_0$ and $46_1$ alternately appear in the second region 54, a density gradient for location can be determined over the entire surface of the two-dimensional tag 40. Thus, threshold values th1 and th2 can dynamically be obtained by the density gradient.

As described above, since, in this embodiment, a data cell which is an element of a two-dimensional tag is divided by a diagonal line therein into diagonal regions where patterns of different brightnesses can be disposed, six code representations are available and the information density can thus be increased.

In addition, by providing in the center a first region for positioning and arranging data cells in which information about an object is arranged so as to surround the first region, a two-dimensional pattern is displayed in a two-dimensional tag, and thus the outer circumference having a large capacity for information can be effectively utilized. Accordingly, the two-dimensional tag can be provided with a data region making use of the information-rich outer circumference and excluding waste.

Further, since the central closed region of the two-dimensional tag is detected, and the data cells for detecting the attitude are provided on a straight line along a diagonal line of the two-dimensional tag to restrict the rotation of the two-dimensional tag, the location of the two-dimensional tag can easily be detected and the attitude thereof can be corrected even if the attitude is caused to change by rotation of the two-dimensional tag, or wherever in an image the two-dimensional tag is located.

In addition, since, in reading a data cell, black and white are determined by the brightness difference or dispersion of the diagonal pixels of the data cell, namely, by density gradient, the pattern displayed in the data cell can be identified reliably even if change occurs in the brightness of the image. Accordingly, a two-dimensional tag can be provided having a high degree of freedom which does not depend on the placement direction or background.

Since the two-dimensional pattern has a large degree of freedom and allows easy expansion of the data capacity by the addition of data cells in the outer circumference thereof, as described above, it can not only be used as a data carrier as in other two-dimensional codes, but also it is very effective in the management or the like of plant warehouses where various types of subassemblies are generated.

Further, if a CCD camera is used as a sensor, the location and information of a two-dimensional tag can be read simply by placing an object in the wide visual field of the CCD camera, without scanning the object or disposing a scanner as in the bar code, thereby enabling the location management of the objects within a warehouse. In addition, subassemblies produced in the manufacturing process may be variously combined depending on the product model, lot, or process, and a code of a large data capacity is required to separately manage them in a temporary storage warehouse. Also in large systems, since replacement or addition of parts is often performed, it is important to manage products waiting for introduction after construction modification or removed parts, and thus the two-dimensional tag of this embodiment effectively functions for managing articles.

In addition, in the above embodiment, description has been made of a case in which to form a two dimensional-tag, a two-dimensional pattern (binary density pattern) is represented by different densities which can be largely classified by black and white corresponding to dark and light brightness, but the present invention is not limited to the representation by density, and a plurality of colors may be used, or colors and densities may also be combined. In this case, if a code (value) is assigned to each code for the patterns of FIG. 3, the density of information which can be represented in a data cell can be increased. As the detector such as the CCD camera for picking up the image of the data cell, a color detector may be used. In addition, if not only the patterns of FIG. 3 are formed for each color, combination of colors such as one color, the other color, and composite of one and the other colors as a pattern is considered within a pattern, the density of information which can be represented in a data cell can be further increased.

As described above, in accordance with the two-dimensional management pattern of the present invention, there is an advantage that the location or the location and direction of the two-dimensional management pattern can be identified from the first region, a unit data cell as a reference can be detected from the second region, and information to be held can easily be detected from the third region.

Further, there is an advantage in that the identification of the location and direction of the two-dimensional management pattern is made easy by including a direction pattern and a location identification pattern in the first region, and reference unit patterns can easily be detected if the unit patterns are arranged in a direction from the first region to the outer circumference of the two-dimensional management pattern in such a way that the unit patterns are contiguous in a specified sequence.

In addition, a plurality of values can be represented by one unit pattern by representing the unit pattern with different densities or colors on both sides of a diagonal line therein, there is an advantage that the amount of information can be increased and the information recording density can be increased.

In accordance with the information display tag of the present invention, since the two-dimensional management pattern having an increased information recording density is recorded, there is an advantage in that it can record a large amount of information even if it is small in size, thereby enabling a large amount of information about an object to be recorded or detected.

In accordance with the image processing method of the present invention, since different sites are determined when different densities or colors are detected in the plurality of sites of an image picked up from the information display tag provided in an object, there is an advantage that not only a pattern can be detected without providing fixed threshold values, but also the pattern can easily be detected even if density or color changes uniformly.

Furthermore, there is an advantage in that, by identifying a pattern from the relationship among the densities or colors corresponding to the plurality of sites in a unit pattern, a plurality of values can be detected in the unit pattern, and even if a large amount of information is recorded, the corresponding information can be detected easily.

Moreover, since the unit pattern can be identified by detecting densities or colors different on both sides of the diagonal line of the unit pattern, and comparing the difference in density or color with the locational relationship, there is an advantage in that the unit pattern in which information is presented can be simply detected with a simple construction.

Further, since a portion where density or color changes can be identified by spatially differentiating a converted image obtained by conversion such that very small regions are removed from the image obtained by reading an information display tag, and the contour of the first region can easily be extracted using the differentiated image, there is an advantage in that the location and direction of the two-dimensional management pattern can easily be identified from the extracted contour.

In accordance with the image processing device of the present invention, since an information display tag is detected by an image detection means, very small regions are removed and the contour of the first region is extracted by a preprocessing means, and the location and direction of the two-dimensional management pattern are detected from the contour, there is an advantage in that the setting of conditions for reading the information about an object is facilitated, and the information about the object can easily be analyzed because of the use of each of the relationships among the densities or colors corresponding to the plurality of sites within a unit pattern and an array of unit patterns.

Of course, many modifications and adaptations to the present invention could be made to advantage without departing from the spirit of this invention. Further some features of the present invention could be used without corresponding use of other features. Accordingly, this description should be considered as merely illustrative of the principles of the present invention and not in limitation thereof.

We claim:

1. A two-dimensional management pattern for reading the image of at least part of an object to detect information about the object based on the read image, comprising:

a first region located near the center of said two-dimensional management pattern and having a locational reference pattern for identifying the location of said two-dimensional management pattern;

a second region with unit patterns of at least one of multiple types arranged in a specified direction from said first region to the outer circumference of said two-dimensional management pattern; and a third region other than said first and second regions with said multiple types of unit pattern arranged to represent said information about the object.

2. The two-dimensional management pattern of claim 1 wherein said second region has multiple types of unit pattern arranged in a specified direction from said first region to the outer circumference of said two-dimensional management pattern in such a way that patterns are contiguous in a specified sequence.

3. The two-dimensional management pattern of claim 1 wherein said second region has multiple types of unit patterns arranged in a specified direction along a straight line between a specified point in said first region and at least one point in the outer circumference of said two-dimensional management pattern in such a way that patterns are contiguous in a specified sequence.

4. The two-dimensional management pattern of claim 1 wherein said multiple types of unit pattern are rectangular and comprise a first pattern consisting of a first density over the entire surface, a second pattern consisting of a second density differing from the first density over the entire surface, a third pattern divided by a first diagonal line therein into one site consisting of the first density and the other consisting of the second density, a fourth pattern divided by a second diagonal line therein into one site consisting of the first density and the other consisting of the second density, a fifth pattern divided by the first diagonal line into one site consisting of the second density and the other consisting of the first density, a sixth pattern divided by the second diagonal line into one site consisting of the second density and the other consisting of the first density.

5. The two-dimensional management pattern of claim 1 wherein said multiple types of unit pattern are rectangular and comprise a first pattern consisting of a first color over the entire surface, a second pattern consisting of a second color differing from the first color over the entire surface, a third pattern divided by a first diagonal line therein into one site consisting of the first color and the other consisting of the second color, a fourth pattern divided by a second diagonal line therein into one site consisting of the first color and the other consisting of the second color, a fifth pattern divided by the first diagonal line into one site consisting of the second color and the other consisting of the first color, and a sixth pattern divided by the second diagonal line into one site consisting of the second color and the other consisting of the first color.

6. An information display tag wherein the two-dimensional management pattern of claim 1 is displayed within a specified range.

7. A two-dimensional management pattern for reading the image of at least part of an object to detect information about the object based on the read image, comprising:
   a first region located near the center of said two-dimensional management pattern and having a locational reference pattern for identifying the location and direction of said two-dimensional management pattern;
   a second region with unit patterns of at least one of multiple types arranged in a specified direction from said first region to the outer circumference of said two-dimensional management pattern; and
   a third region other than said first and second regions with said multiple types of unit pattern arranged to represent said information about the object.

8. The two-dimensional management pattern of claim 7 wherein said second region has multiple types of unit pattern arranged in a specified direction from said first region to the outer circumference of said two-dimensional management pattern in such a way that patterns are contiguous in a specified sequence.

9. The two-dimensional management pattern of claim 7 wherein said locational reference pattern has a direction pattern located in the center and a locational identification pattern arranged around the direction pattern in such a way that it can be distinguished from the direction pattern.

10. The two-dimensional management pattern of claim 7 wherein said second region has multiple types of unit patterns arranged in a specified direction along a straight line between a specified point in said first region and at least one point in the outer circumference of said two-dimensional management pattern in such a way that patterns are contiguous in a specified sequence.

11. The two-dimensional management pattern of claim 7 wherein said multiple types of unit pattern are rectangular and comprise a first pattern consisting of a first density over the entire surface, a second pattern consisting of a second density differing from the first density over the entire surface, a third pattern divided by a first diagonal line therein into one site consisting of the first density and the other consisting of the second density, a fourth pattern divided by a second diagonal line therein into one site consisting of the first density and the other consisting of the second density, a fifth pattern divided by the first diagonal line into one site consisting of the second density and the other consisting of the first density, a sixth pattern divided by the second diagonal line into one site consisting of the second density and the other consisting of the first density.

12. The two-dimensional management pattern of claim 7 wherein said multiple types of unit pattern are rectangular and comprise a first pattern consisting of a first color over the entire surface, a second pattern consisting of a second color differing from the first color over the entire surface, a third pattern divided by a first diagonal line therein into one site consisting of the first color and the other consisting of the second color, a fourth pattern divided by a second diagonal line therein into one site consisting of the first color and the other consisting of the second color, a fifth pattern divided by the first diagonal line into one site consisting of the second color and the other consisting of the first color, and a sixth pattern divided by the second diagonal line into one site consisting of the second color and the other consisting of the first color.

13. An information display tag wherein the two-dimensional management pattern of claim 7 is displayed within a specified range.

14. An image processing method for reading an information display tag as an image and detecting the information contained in the information display tag based on the read image, comprising the steps of:
   detecting the density or color of a plurality of sites of said image and determining that the sites differ when they have different densities or colors; and
   determining the location of said information display tag by detecting a first region in substantially the center of said information display tag;
   determining the attitude of said information display tag by detecting a second region of said information display tag;
   obtaining information about an object from said information display tag by detecting information contained in a third region of said information display tag based on the results of site density determination.

15. An image processing method for reading, as an image, an information display tag in which a two-dimensional management pattern is displayed and detecting information contained in the information display tag based on the read image, comprising the steps of:
   detecting the density or color of a plurality of sites within the region in which a unit pattern is displayed, determining the relationship among the densities and colors corresponding to respective sites, and identifying the unit pattern based on the relationship determined; and
   detecting the information contained in said information display tag based on the results of said relationship determination.

16. The image processing method of claim 15 comprising the steps of detecting the density or color of the two sites of the unit pattern divided by said diagonal line therein, that is, the first density or color of one site and the second density or color of the other, determining the difference between the first density or color and the second density or color, comparing the difference with the locational relationship between one site and the other to determine the correlationship among the densities and colors corresponding to the plurality of sites, and identifying the unit pattern based on the correlationship determined.

17. An image processing method for reading, as an image, an information display tag in which a two-dimensional management pattern is displayed and detecting the information contained in the information display tag based on the read image, comprising the steps of:

forming a converted image obtained by conversion such that very small regions of about the same density or color that differs from that of surrounding regions will have their density or color changed to that of surrounding regions;

space-differentiating the converted image to obtain a differentiated image;

extracting the contour of the first region using the differentiated image; and identifying the location and direction of the two-dimensional management pattern based on the extracted contour.

18. An image processing device comprising:

an image pickup means for picking up an image including an information display tag in which a two-dimensional management pattern is displayed;

a preprocessing means comprising an image conversion means for forming a converted image obtained by conversion such that very small regions of about the same density or color that differs from that of surrounding regions will have their density or color changed to that of surrounding regions based on the picked-up image, and a contour extraction means for space-differentiating the converted image to obtain a differentiated image, then extracting the contour of the first region using the differentiated image;

a tag location detection means for detecting the location and direction of the two-dimensional management pattern based on the extracted contour;

a region setting means for setting said second and third regions based on the detected location and direction and also setting the region in which said unit pattern is displayed; and a cell data analysis means for detecting the density or color of a plurality of sites within the region in which said unit pattern is displayed, determining the relationship among the densities and colors corresponding to the respective sites, identifying the individual unit patterns based on the relationship determined, and analyzing the information contained in said information display tag based on the arrangement of the multiple types of unit patterns identified.

* * * * *